United States Patent [19]
Yoshimura et al.

[11] Patent Number: 6,146,805
[45] Date of Patent: Nov. 14, 2000

[54] PRINTING METHOD, PRINTER, PRINTED OBJECT, AND OPTICAL DISK

[75] Inventors: Yoshiki Yoshimura, Wakayama; Ikuo Takahashi; Takashi Sakurai, both of Tochigi-ken; Yutaka Kanamaru; Shinji Moriyama, both of Wakayama; Takeshi Atsugi; Masahiro Umehara, both of Tochigi-ken, all of Japan

[73] Assignee: Kao Corporation, Tokyo, Japan

[21] Appl. No.: 09/125,780

[22] PCT Filed: Dec. 24, 1997

[86] PCT No.: PCT/JP97/04798

§ 371 Date: Sep. 11, 1998

§ 102(e) Date: Sep. 11, 1998

[87] PCT Pub. No.: WO98/29784

PCT Pub. Date: Jul. 9, 1998

[30] Foreign Application Priority Data

Dec. 27, 1996 [JP] Japan .................................. 8-356724
Apr. 24, 1997 [JP] Japan .................................. 9-123402

[51] Int. Cl.⁷ .................................................. G03G 15/16
[52] U.S. Cl. .................................. 430/126; 101/DIG. 37; 347/105
[58] Field of Search ............. 430/126, 49; 101/DIG. 37; 347/105

[56] References Cited

U.S. PATENT DOCUMENTS 5,284,731  2/1994  Tyagi et al. .............................. 430/126
5,968,704  10/1999  Chen et al. .............................. 430/126

FOREIGN PATENT DOCUMENTS 5-212857  8/1993  Japan .
6-130841  5/1994  Japan .
7-160129  6/1995  Japan .

*Primary Examiner*—John Goodrow
*Attorney, Agent, or Firm*—Oblon, Spivak, McClelland, Maier & Neustadt, P.C.

[57] ABSTRACT

The present invention aims at satisfactorily printing such as labels by electrophotographic process onto a surface to be printed of an object such as synthetic resin plates such as optical disks. When printing the surface to be printed of the object by transference of charged toner on a transfer medium onto the surface to be printed, an electric charge is supplied to the surface to be printed, by contacting an electrode connected to a power supply device with the surface to be printed, in the vicinity of a transfer position where the toner on the transfer medium is transferred onto the surface to be printed. The surface electric resistance of the surface to be printed of the object is adjusted to be equal to or less than $1 \times 10^{14}$ Ω, in advance of the transfer of the toner.

13 Claims, 10 Drawing Sheets

PRINTING METHOD, PRINTER, PRINTED OBJECT, AND OPTICAL DISK

FIELD OF THE INVENTION

The present invention relates to a method for printing images such as labels onto a surface of an object such as synthetic resin plate such as optical disk by means of an electrophotographic process, and to an apparatus therefor, and moreover, to those printed objects and optical disks which are obtained thereby.

DISCUSSION OF THE BACKGROUND

For example, an optical disk is constituted such that a recorded surface of a substrate made of synthetic resin such as polycarbonate is provided with a reflective coat which is formed by vapor deposition a metal such as gold or aluminum onto the recorded surface, and a protective coat such as ultraviolet cured resin on the reflective coat for avoiding oxidation of the same. In this optical disk, the recorded surface of the disk substrate is formed with concave-convex pits for recording data, and is provided with the reflective coat thereon.

In such an optical disk, it is required to recognize the recorded contents, from the exterior appearance. Thus, it is generally performed to offset print or screen print a label or index onto the protective coat, by means of ultraviolet curable ink. However, in such a printing procedure, there is required a plate making process since the plate is to be prepared in advance, deteriorating the efficiency of printing in case of many kinds or a small amount.

Thus, there has been proposed to adopt an electrophotographic process to thereby omit plate making, such as in Japanese Unexamined Patent Publication No.5-212857.

Generally, in an electrophotographic process, the charged toner on a transfer medium such as drum or belt, is adsorbed onto the object by applying an electric charge having a polarity opposite to that of the toner from the side (back surface) opposite to the transfer medium of the matter to be printed while adhering the transfer medium onto the object, or the toner is promoted to separate from the transfer medium by supplying an electric charge having a polarity the same as that of the toner to the side opposite to the transfer medium of the matter to be printed.

Unfortunately, if it is intended to print an optical disk by supplying an electric charge from the side of the disk opposite to the transferring medium, as in the conventional electrophotographic process, there is caused such a problem that the toner is not assuredly transferred onto the disk, such as due to the thickness of the latter.

To avoid this problem, the aforementioned Japanese Unexamined Patent Publication No.5-212857 has made an endeavor to previously charge the surface of the optical disk, i.e., the side (surface) to be printed onto which the toner is to be transferred, with a polarity opposite to that of the toner, by bringing a charging scorotron close to such a surface, before the transfer of toner from the transfer medium. At the same time, it is intended to promote the separation of the toner from the transfer medium, by applying a high voltage having a polarity same with the toner from the back side of the transfer medium by a transfer corotoron or transfer roll.

However, there has remained such a problem that the printing lacks uniformity, and the printable area is limited, even by this technique.

SUMMARY OF THE INVENTION

In view of these circumstances, it is therefore an object of the present invention to provide a printing method and apparatus which can uniformly and satisfactorily print the whole of an object made of synthetic resin plate such as optical disk, and can be simply constructed.

It is another object of the present invention to provide those printed matters and optical disks, which have been prepared by the above printing method and apparatus.

In order to achieve the above objects, the present invention provides a printing method for printing upon a surface to be printed of an object by transferring charged toner on a transfer medium onto the surface to be printed, wherein an electric charge is supplied to the surface to be printed, by contacting an electrode connected to a power supply device with the surface to be printed, in the vicinity of a transfer position where the toner on the transfer medium is transferred onto the surface to be printed of the object.

Thus the transfer performance is remarkably improved, since the electrode for supplying an electric charge is directly contacted with the surface to be printed.

Here, the expression of "in the vicinity of a transfer position" means a position where the electrode can contact with the surface to be printed of the object during the transfer operation. Thus, the closer the position of the electrode (electrode position) is to the position (transfer position) where the transfer medium contacts with the surface to be printed of the object, the more preferable. This distance is more preferably within 1 cm, but the electrode should not directly contact with the transfer medium.

In this case, it is more preferable to adjust a surface electric resistance of the surface to be printed of the object to be equal to or less than $1 \times 10^{14}$ Ω, in advance of the transfer of the toner.

As a process for adjusting the surface electric resistance, there can be mentioned one in which the surface to be printed is applied such as with resistance adjusting material or ink including the same.

Further, it is still preferable to adjust the surface electric resistance to be equal to or less than $1 \times 10^{13}$ Ω, and more preferably to be equal to or less than $1 \times 10^{12}$ Ω.

If the object includes a conductive material which is not grounded, there can be provided an excellent printing even without an adjustment of the surface electric resistance. If the surface electric resistance is adjusted as required, there can be provided a more excellent printing. There can be obtained a similar effect by virtue of a receiving portion including a conductive material for conveying the object, when the thickness of the object is small.

Moreover, in addition to the charge supply to the surface to be printed of the object, it is preferable to supply an electric charge to at least one of a surface sideward to the surface to be printed and a surface backward to the surface to be printed, by contacting an electrode connected to a power supply device with the at least one surface. This is because, with this constitution, a surface electric charge necessary for transferring a toner image can be maintained more sufficiently. Further, if the transfer position and the electrode position is separated by a distance, the electric charge supply by the electrode to the surface to be printed may be lost during the transfer of toner onto an edge portion of the object. Nonetheless, the transfer performance onto the edge portion of the surface to be printed is ensured by the electric charge supply from at least one of the side surface side and the back surface side, even in such a case.

It is also possible to effect the electric charge supply to the side surface and/or back surface by providing a receiving portion for transferring the matter to be printed with an electric conductivity, and supplying the electric charge to the receiving portion from the power supply device.

The printing apparatus according to the present invention is constituted such that there is provided an electrode connected to a power supply device for contacting with a surface to be printed, in the vicinity of a transfer position where the toner on the transfer medium is transferred onto the surface to be printed of a matter to be printed.

As the first electrode, there can be preferably adopted a conductive roller, a conductive brush, or a conductive sheet. As the electrode, either of the conductive roller, conductive brush or conductive sheet will do. However, it is preferable that a distance between the transfer position and the electrode position is arranged as close as possible. Thus, the brush or sheet configuration is preferable.

Further, there is further provided an electrode connected to a power supply device for contacting with at least one of a side surface of the object and a surface backward of the object. Preferably, by providing a receiving portion for conveying the object with an electric conductivity to thereby form an electrode, and by supplying an electric charge to the receiving portion, there can be more satisfactorily maintained the surface electric potential necessary for transferring a toner image.

As the power supply device, anyone can be adopted without limitations, if it can stably generate a high voltage. For example, only a direct current supply is enough to obtain a sufficient transfer efficiency. Nonetheless, in addition to the direct current, an alternating current voltage may be applied, to promote the transfer of toner.

As the transfer medium, anyone can be adopted without limitations, if it is typically adopted for electrophotographic printing. Nonetheless, those mediums which include synthetic rubber are preferable, in consideration for avoiding damage of the surface to be printed of the matter to be printed when the same is contacted by the medium. Further, in case of effecting a multi-color printing, belts are preferred to drums, since the freedom of layout can be ensured and the whole apparatus can be reduced in size then.

Meanwhile, as the objects to which the printing is applied in the present invention, anyone can be adopted without limitations. Nonetheless, it is worth mentioning that the printing method of the present invention can be applied to a synthetic resin plate having a thickness equal to or greater than 0.3 mm, to which the conventional electrophotographic printing could not have been applied, and even to wood and ceramics.

As such synthetic resin plates, there can be mentioned optical disks. Particularly, with those representative ones, there can be mentioned a disk wherein a reflective coat is formed on a substrate made of synthetic resin such as polycarbonate, and a protective coat made of ultraviolet cured resin is formed on the reflective coat, a disk additionally having a recording layer between the substrate and the reflective coat, and a disk which is provided by adhering the disks having the constructions described above. In these cases, the reflective coat is typically formed of a conductive material, so that it constitutes a conductive layer.

When the surfaces of optical disks are printed such as with labels by utilizing the method and apparatus of the present invention, there can be obtained optical disks free from printing unevenness.

BRIEF DESCRIPTION OF THE DRAWINGS

The characteristic construction as well as functions and effects based thereon of the present invention will become more apparent from the following embodiments.

DETAILED DESCRIPTION OF THE PREFERRED EMBODIMENTS

There will be described embodiments of the present invention hereinafter.

The objects that will be printed upon according to the present invention are not specifically limited. Nonetheless, there will be exemplarily described herein optical disks, particularly, representative one wherein a reflective coat is formed on a substrate made of synthetic resin such as polycarbonate, and a protective coat made of ultraviolet cured resin is formed on the reflective coat.

Figure 1:
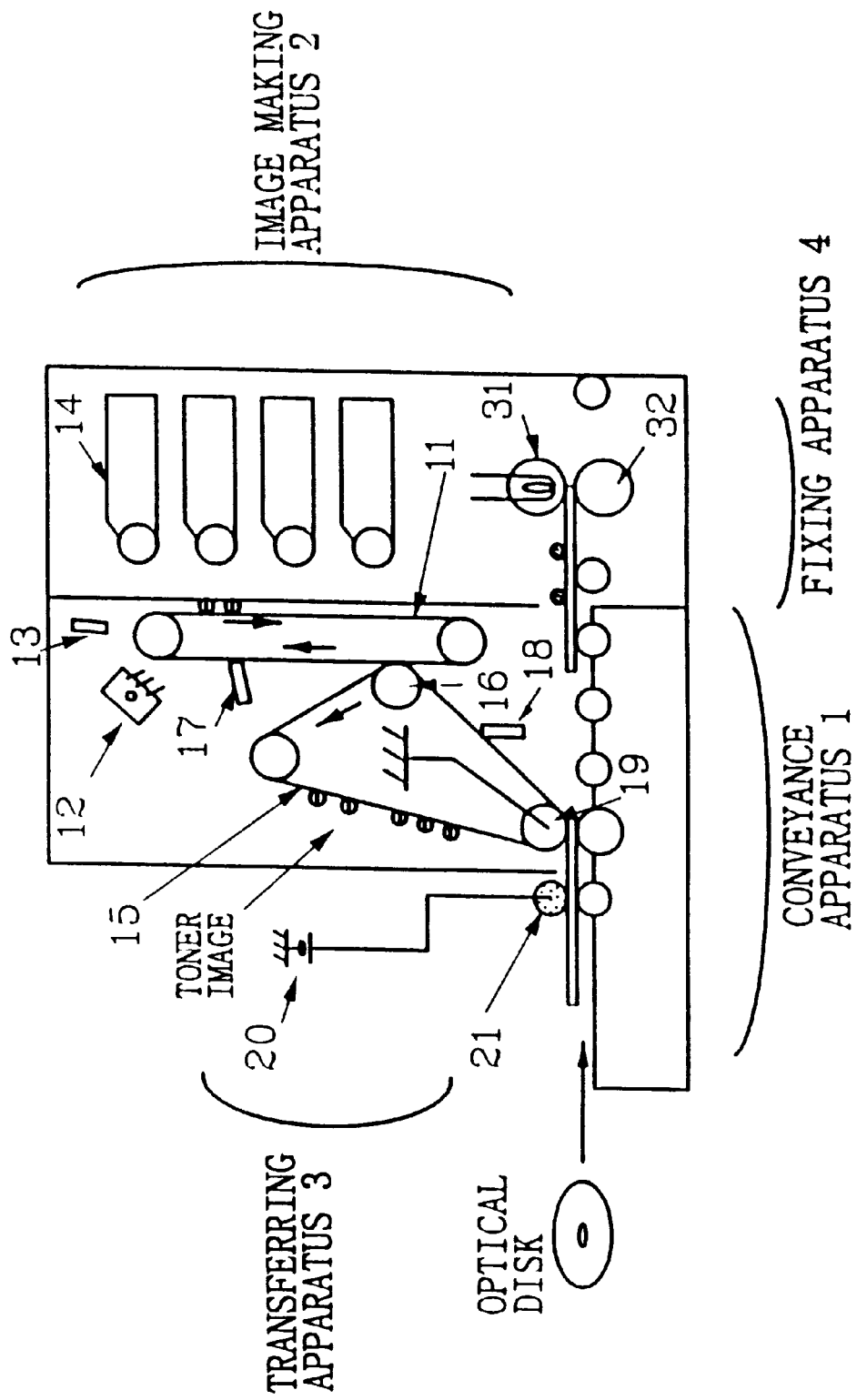
FIG. 1 is a schematic view of a first embodiment of the present invention.

FIG. 1 is a schematic view showing the first embodiment according to the present invention.

A printing apparatus is constituted to include a conveyance apparatus 1, an image making apparatus 2, a transferring apparatus 3, and a fixing apparatus 4.

The image making apparatus 2 includes a photosensitive body (photosensitive belt) 11, a charge device 12, an exposure device 13, a development device 14, a transfer medium (transfer belt) 15, and an electrostatic transferring device 16, such that a toner image is applied onto the transfer belt 15 by means of an electrophotographic process.

The photosensitive belt 11 rotates in an endless manner, and a surface thereof is charged by the charge device 12. The exposure device 13 is constituted such as by a laser exposure device. The exposure device 13 operates to expose the charged surface of the photosensitive belt 11 so that a predetermined printing pattern is formed on the charged surface. The charges on the exposed portion of the charges on the surface of the photosensitive belt 11 applied by the charge device 12 are eliminated by a photoconductive effect so that an electrostatic latent image is formed. The exposure device 13 may effect the exposure by utilizing a copy of printing pattern, or a printing signal output from a computer in which the copy of printing pattern is registered.

The development device 14 is adopted to form a toner image by supplying charged color powder toner (negative charge) on the surface of the photosensitive belt 11 to thereby develop the electrostatic latent image. Namely, the toner is attracted by the electric field of the electrostatic latent image, to form a visible toner image.

The transfer belt 15 rotates synchronously with the photosensitive belt 11, in an endless manner. The electrostatic transferring device 16 electrostatically transfers the toner image on the photosensitive belt 11 which has been formed by the development device 14, onto the transfer belt 15. This electrostatic transference is effected such as by applying from a back side of the transfer belt 15 a voltage having a polarity opposite to that of the toner. Thus, the toner image is applied to the transfer belt 15. There are provided cleaning devices 17 and 18, for the photosensitive belt 11 and transfer belt 15, respectively.

The transferring apparatus 3 is constituted to include a transfer roll 19 at the lower part of the transfer belt 15 which faces to a disk conveyance path of the conveyance apparatus 1, and is provided with an electrode 21 such as a conductive rubber roller connected to a power supply device (electric charge supply device) 20 such that the electrode 21 contacts with a surface to be printed of the disk at the upstream of the transfer roll 19 in the disk conveyance path.

Particularly in this embodiment, the conductive rubber roller 21, as the electrode contacting with the surface to be printed of the disk, is applied with a positive voltage by the power supply device 20, and the transfer roll 19 at the back side of the transfer belt 15 is grounded.

Although the electrode in this embodiment is provided by adopting the conductive rubber roller 21, it is possible to adopt others than such a conductive rubber roller, such as conductive brush, conductive sheet, in the present invention.

When the electrode is provided by adopting a conductive rubber roller, conductive brush, or conductive sheet, the conductive rubber roller, brush or sheet is adjusted by the power supply device 20 with respect to the supplied voltage such that the conductive rubber roller, brush or sheet contacts with the surface to be printed of the disk and supplies onto the surface a charge having a polarity opposite to the toner while being subjected to adjustment of the supplied voltage thereof, to thereby enable the toner image applied to the transfer belt 15 to be electrostatically transferred to the disk.

The conductive rubber roller may be such as a rubber roller comprising a rubber composition prepared by kneading conductive silicone rubber and conductive EPDM (ethylene-propylene rubber) onto a periphery of a core material, and a fluororesin layer coated on a surface of the composition.

As a conductive brush, there is mentioned a conductive rayon fiber which is worked into a flat brush configuration.

As a conductive sheet, there is mentioned a sheet prepared by kneading conductive material into a resin such as Teflon.

Meanwhile, the fixing apparatus 4 is constituted of a heat roll 31 and a press roll 32. When these heat roll 31 and press roll 32 are adopted as the fixing apparatus 4, these rolls are arranged above and under the conveyance path for the disk being conveyed by the conveyance apparatus 1, respectively, to cooperatively pinch the disk and instantaneously apply heat and pressure to the same, so that the toner image transferred to the disk is fixed to the surface to be printed of the disk.

When a label printing is effected by the printing apparatus of the present invention, it is possible to effect the label printing according to the following steps.

1) To form a toner image corresponding to a printing pattern on the transfer belt 15 by the image making apparatus 2 by means of an electrophotographic process.

2) To electrically transfer the toner image formed on the transfer belt 15 onto the surface to be printed of the disk being conveyed by the conveyance apparatus 1, by supplying electric charge onto the surface to be printed of the disk by means of the electrode provided in the transferring apparatus 3.

3) Then, to fix the toner image transferred on the disk, by the fixing apparatus 4.

In the step 2), it is also possible to fix the toner image onto a protective coat or a reflective coat of the disk.

When the printing is effected in such a manner as explained above, an electric charge is directly supplied to the surface to be printed of the disk in a contacted manner, so that it becomes possible to supply an electric charge necessary and sufficient for electrically transferring the toner image onto the surface to be printed of the disk, irrespectively of the surface electrical resistance of the surface to be printed or the thickness of the disk substrate.

Thus, those printed images formed on the surface to be printed of the disk by virtue of the disk label printing method according to the present invention are provided in a high quality free from occurrence of defective transfer and disarray of images.

Figure 2:
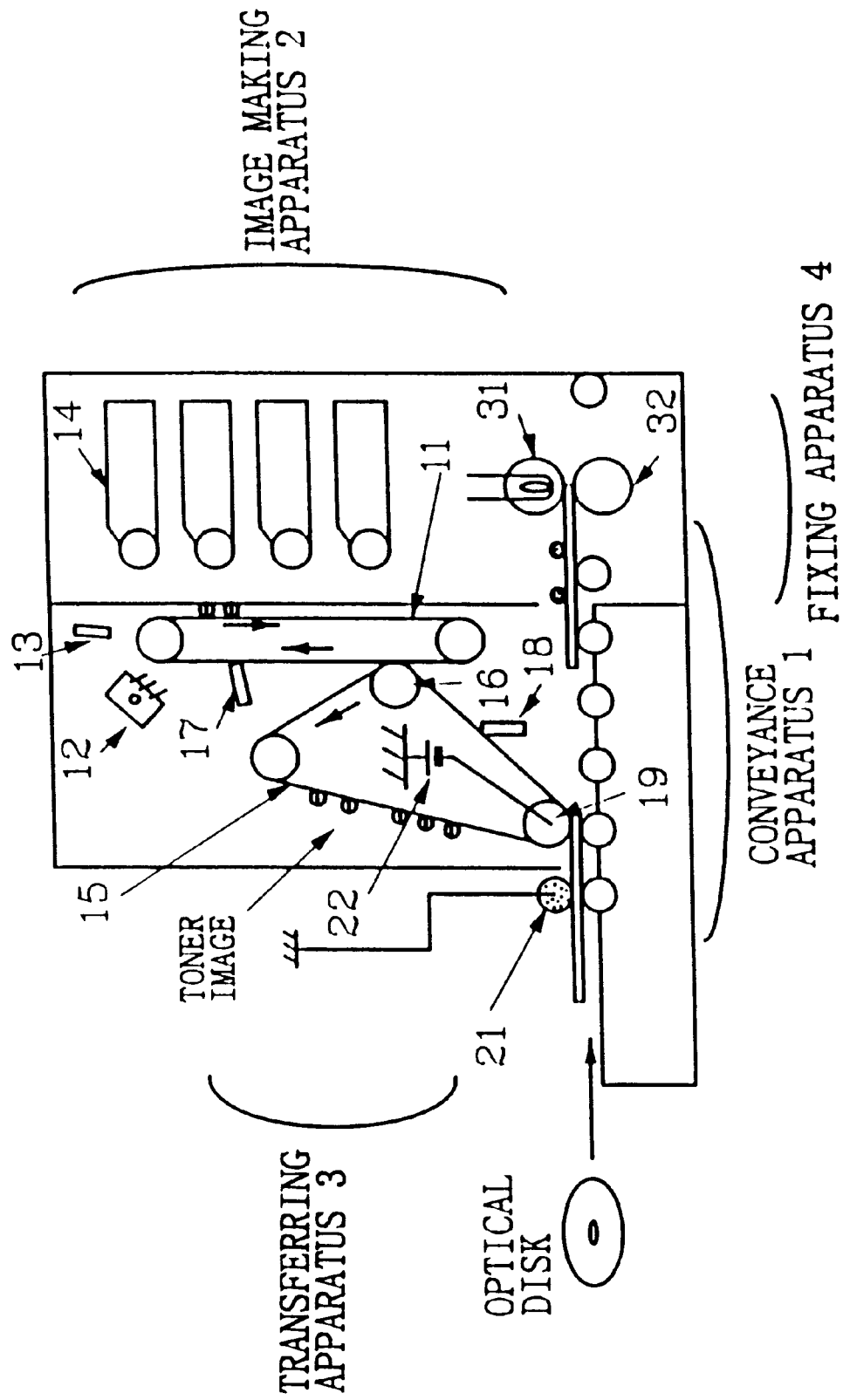
FIG. 2 is a schematic view of a second embodiment of the present invention.

FIG. 2 is a schematic view showing a second embodiment of the present invention.

In this embodiment, there is grounded the conductive rubber roller 21 as an electrode for contacting with the surface to be printed of the disk, while supplying a negative voltage to the transfer roll 19 at the back side of the transfer belt 15 by means of a power supply device 22.

That is, the electric charge is supplied to the surface to be printed of the disk in a contacted manner, and a negative electric charge is supplied to the back side of the transfer medium by the power supply device 22, to thereby transfer the toner image onto the surface to be printed of the disk. In this case, the conductive rubber roller 21 can be regarded as being substantially connected to the power supply device 22.

The sole difference from FIG. 1 is that the supplying direction of electric charge is reversed, maintaining such as the transfer ability.

Figure 3:
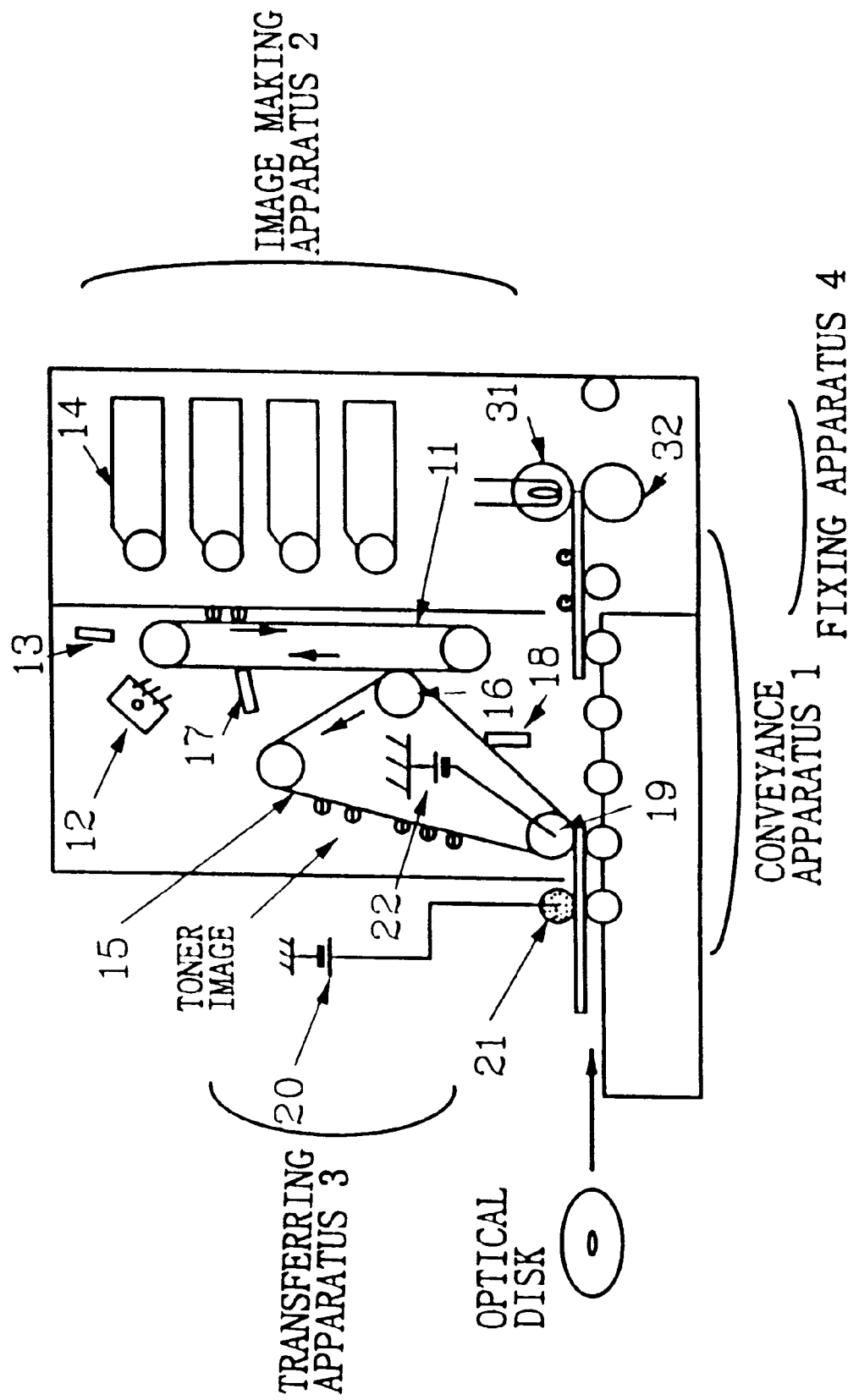
FIG. 3 is a schematic view of a third embodiment of the present invention.

FIG. 3 is a schematic view showing a third embodiment of the present invention.

In this embodiment, the conductive rubber roller 21 as an electrode for contacting with the surface to be printed of the disk is supplied with a positive voltage by the power supply device 20, while the transfer roll 19 at the back side of the transfer belt 15 is supplied with a negative voltage by the power supply device 22.

That is, the surface to be printed of the disk is supplied with an electric charge in an contacted manner, and at the same time the transfer medium is also supplied with an electric charge from its back side, to thereby transfer the toner image onto the surface to be printed of the disk.

The difference from FIG. 1 is that the transfer medium is additionally supplied with an electric charge from its back side to transfer further electrically the toner image onto the surface to be printed of the disk, providing satisfactory label printing.

Figure 4:
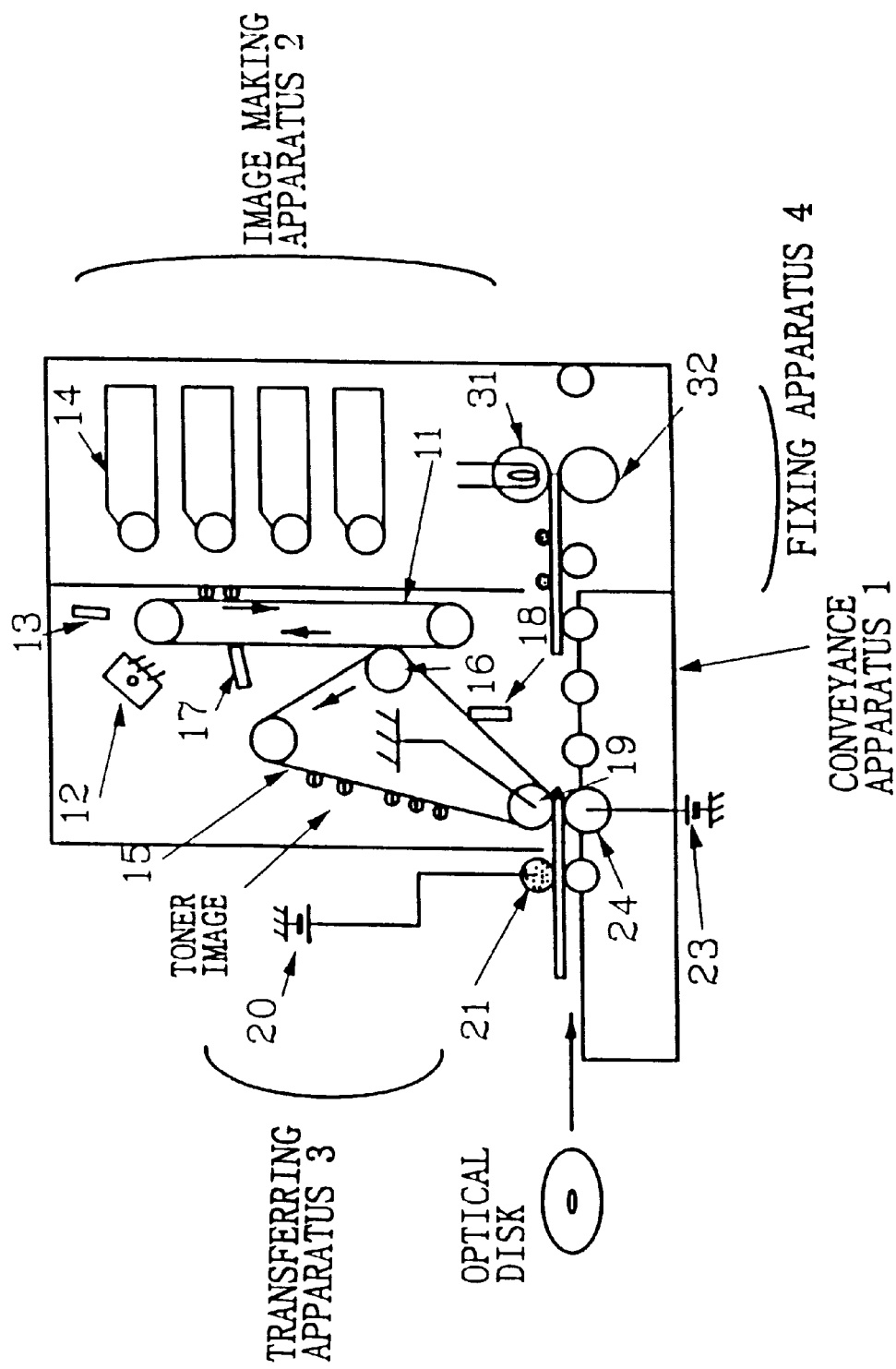
FIG. 4 is a schematic view of a fourth embodiment of the present invention.

FIG. 4 is a schematic view showing a fourth embodiment of the present invention.

In this embodiment, the back side of disk is supplied with a positive voltage in a contacted manner by providing a conductive roller 24 as an electrode connected to a power supply device 23, in addition to the arrangement that the conductive rubber roller 21 as an electrode contacting with the surface to be printed of the disk is supplied with a positive voltage by the power supply device 20, and that the transfer roll 19 at the back side of the transfer belt 15 is grounded.

That is, the surface to be printed of the disk is supplied with an electric charge in an contacted manner, and the back side of surface to be printed of the disk is also supplied with an electric charge, to thereby transfer the toner image onto the surface to be printed of the disk.

As described above, when the back side of surface to be printed of the disk is supplied with an electric charge in addition to the electric charge supplied to the surface to be printed of the disk, there can be more satisfactorily maintained or ensured a surface electric charge necessary for transferring the toner image onto the surface to be printed of the disk. Further, if the transfer roll 19 and the conductive roller 21 are separated by a distance, the electric charge onto the surface to be printed of the disk from the conductive rubber roller 21 may be lost during the transfer of toner onto the edge portion of the surface to be printed. Nonetheless, the transfer performance is ensured by the electric charge supply from the conductive rubber roller 24 at the back side of the disk. Thus, it becomes possible to electrically transfer the toner image onto the surface to be printed of the disk in a more uniform manner by means of an electrophotographic process, thereby attaining satisfactory label printing.

Figure 5:
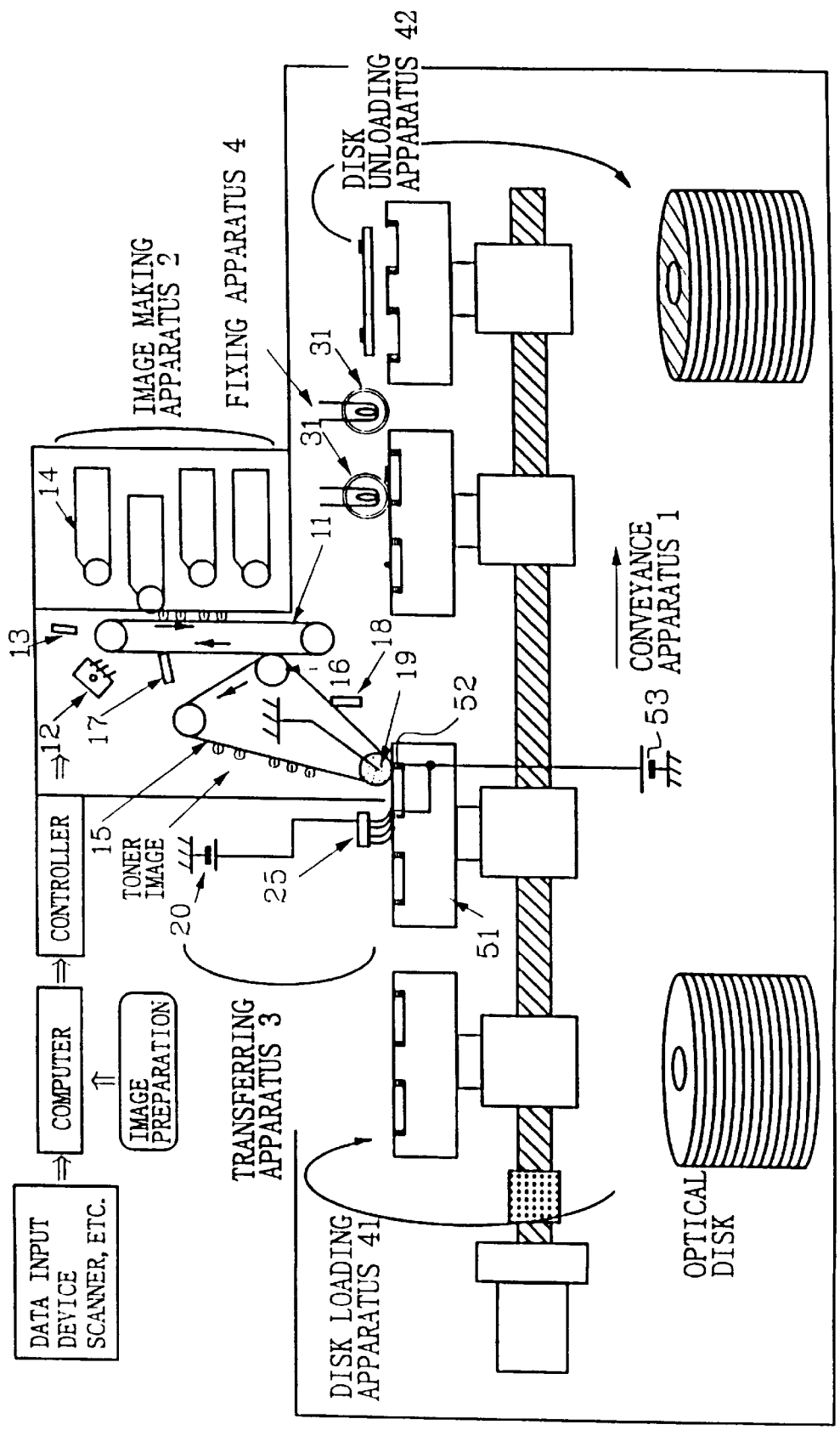
FIG. 5 is a schematic view of a fifth embodiment of the present invention.
Figure 6:
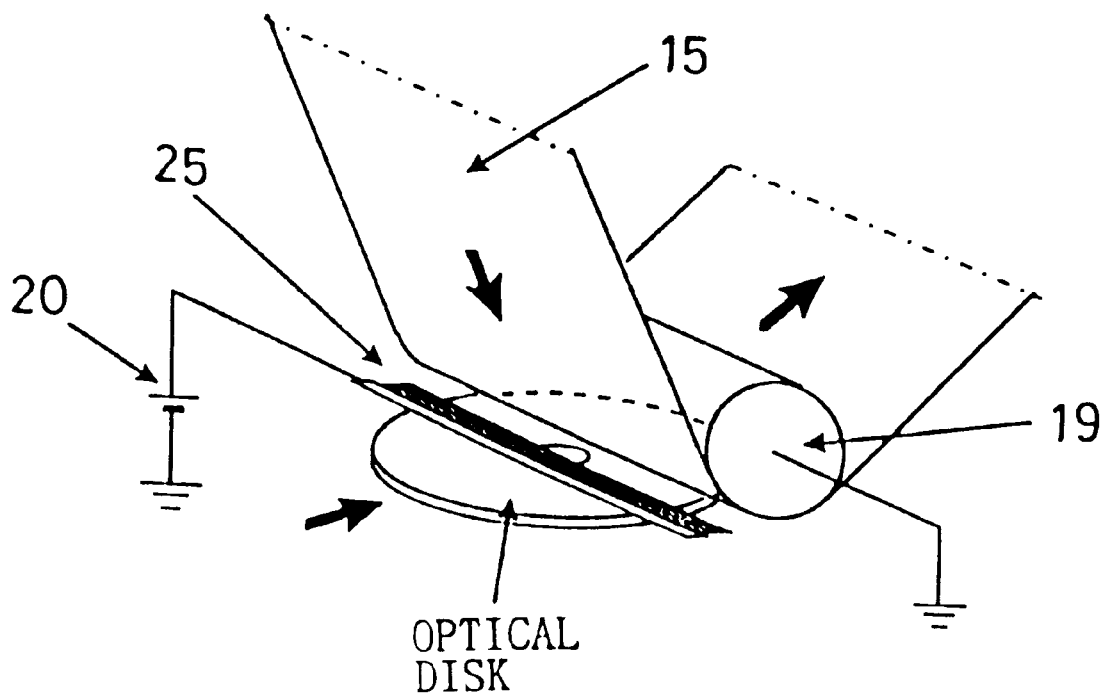
FIG. 6 is a perspective view of a transferring apparatus of the fifth embodiment.
Figure 7:
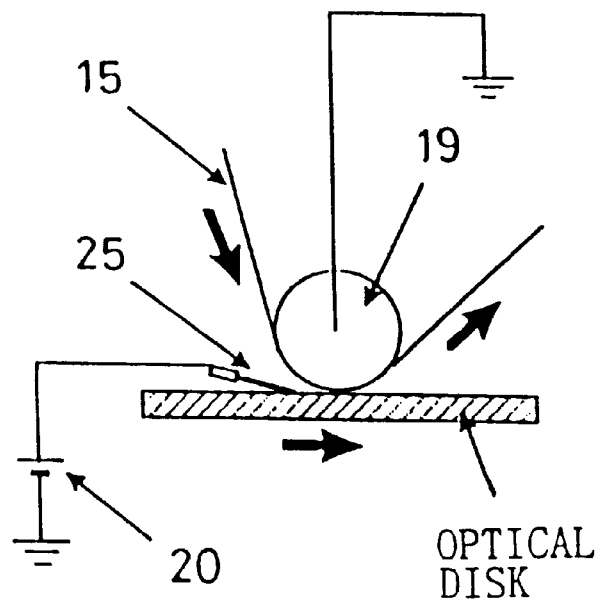
FIG. 7 is a sectional view of the transferring apparatus of the fifth embodiment.
Figure 8:
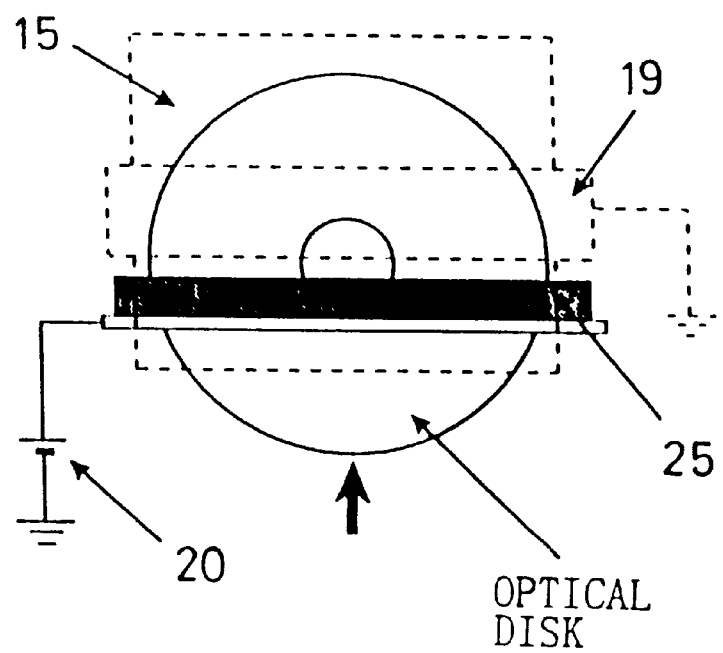
FIG. 8 is a plan view of the transferring apparatus of the fifth embodiment.
Figure 9:
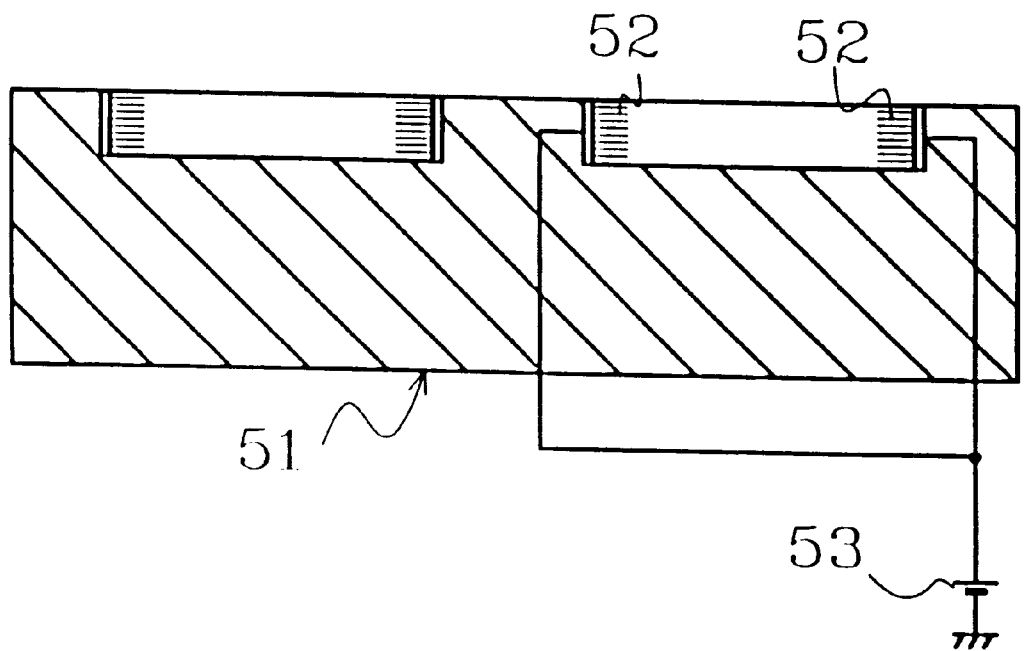
FIG. 9 is a sectional view of a conveyance table of the fifth embodiment.

FIG. 5 is a schematic view showing a fifth embodiment of the present invention. FIG. 6 is a perspective view, FIG. 7 is a sectional view, FIG. 8 is a plan view, of the transferring device. FIG. 9 is a sectional view of a conveyance table.

The printing apparatus is constituted to include a conveyance apparatus 1, an image making apparatus 2, a transferring apparatus 3, and a fixing apparatus 4.

Further, there are arranged a disk loading apparatus 41 at an inlet, a disk unloading apparatus 42 at an outlet, the image making apparatus 2 at an intermediate position between them, the transferring apparatus 3 at a position between the loading apparatus 41 and image making apparatus 2, the fixing apparatus 4 at a position between the image making apparatus 2 and unloading apparatus 42.

The optical disks are conveyed by the conveyance apparatus 1 through a path from the loading apparatus 41, via transferring apparatus 3, image making apparatus 2, and fixing apparatus 4, up to the unloading apparatus 42.

That is, the conveyance apparatus 1 has conveyance tables (disk receiving portions) 51 which are movable in the conveyance direction. These conveyance tables 51 are moved successively in the order of a loading position for receiving a disk from the disk loading apparatus 41, a transfer position by the transferring apparatus 3, a fixing position by the fixing apparatus 4, and an unloading position by the disk unloading apparatus 42. The tables are returned from the unloading position to the loading position, after unloading the disk.

The image making apparatus 2 is identical with that shown in FIG. 1.

The transferring apparatus 3 is also identical with that shown in FIG. 1, except that it adopts a conductive brush 25 as an electrode.

As shown, when adopting the conductive brush 25 as the electrode, the distance between the electrode position and transfer position is shortened, eliminating the transfer unevenness up to the end of disk. This is also true in case of adopting a conductive sheet, which is more advantageous than adopting a conductive roller.

In the conveyance apparatus 1, there are arranged electrodes, concretely, conductive napped sheets 52 in a duplicate manner, inward and outward diametrically of the disk receiving portion of the conveyance table 51 so as to supply electric charges to the lateral surfaces of disk (outer and inner lateral circumferential surfaces of disk), and the sheets 52 are connected to a power supply device 53.

As described, the lateral surfaces of disks are supplied with electric charges, so that the surface electric potential necessary for transferring the toner image can be more satisfactorily maintained up to the edge portion of the surface to be printed. Particularly, by adopting the conductive napped sheets 52, the tips of the naps at the surface sides of the sheets are assuredly brought close to or contacted with the lateral surfaces of disk, stably supplying electric charge.

As the conductive napped sheet, there can be mentioned a "rubbing cloth" having pile length of 2.5 mm, manufactured by Toei Sangyo K.K.

The fixing apparatus 4 is constituted of heat rolls 31, here. In this case of adopting heat rolls 31 as the fixing apparatus 4, they are disposed above the conveyance path of the disks to be conveyed by the conveyance apparatus 1, and instantaneously apply heat and pressure to the disk to thereby fix the transferred toner image on the disk to its surface. In this concern, the temperature of the disk surface should have become equal to or higher than the toner melting temperature in order to ensure the tight adhesion between the toner and disk surface. Thus, it is effective to perform pre-heating such as by heat roll or oven, before the main fixing. Therefore, two heat rolls 31, 31 are juxtaposed, the upstream one of which is for pre-heating, in this embodiment.

Figure 10:
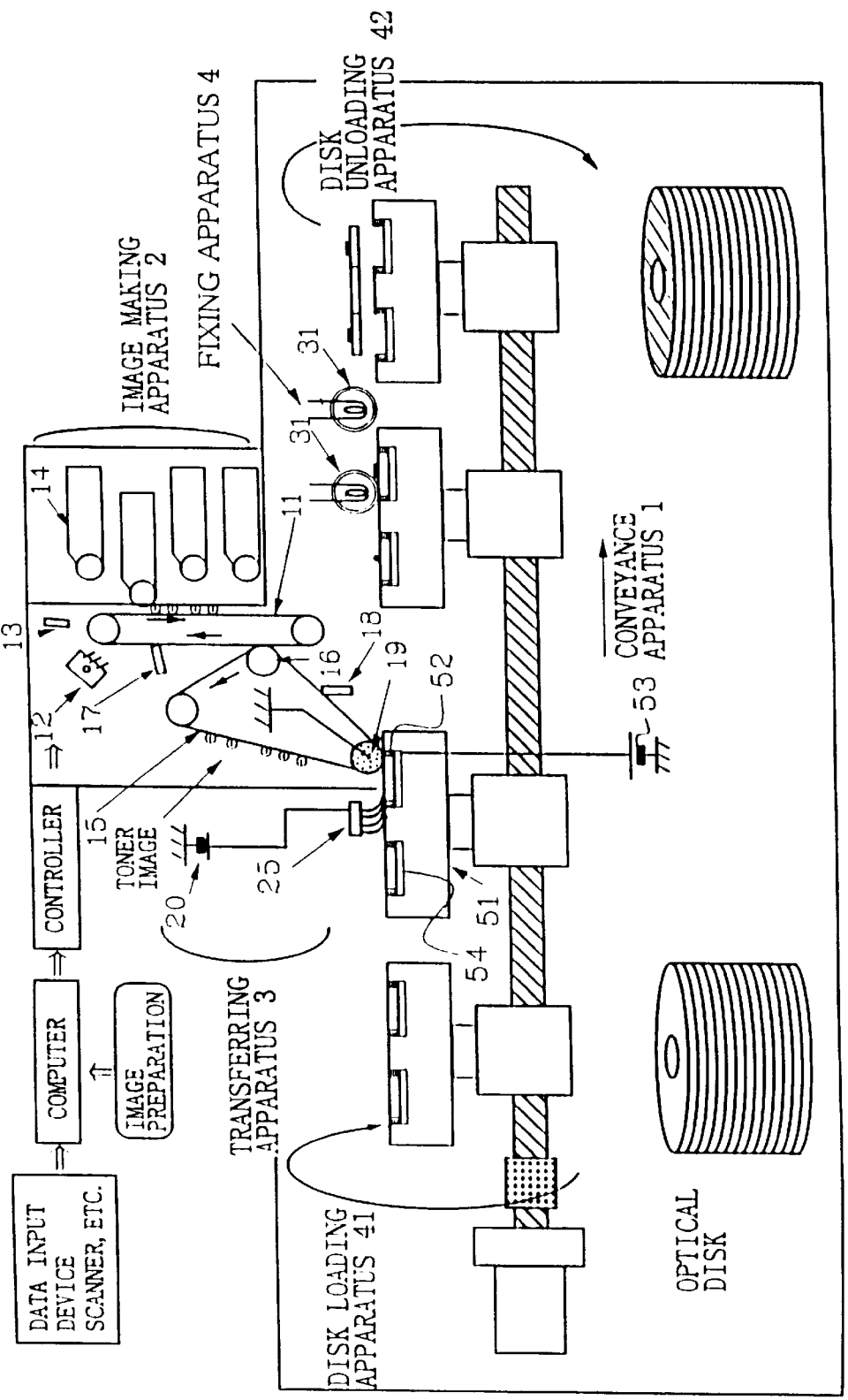
FIG. 10 is a schematic view of a sixth embodiment of the present invention.
Figure 11:
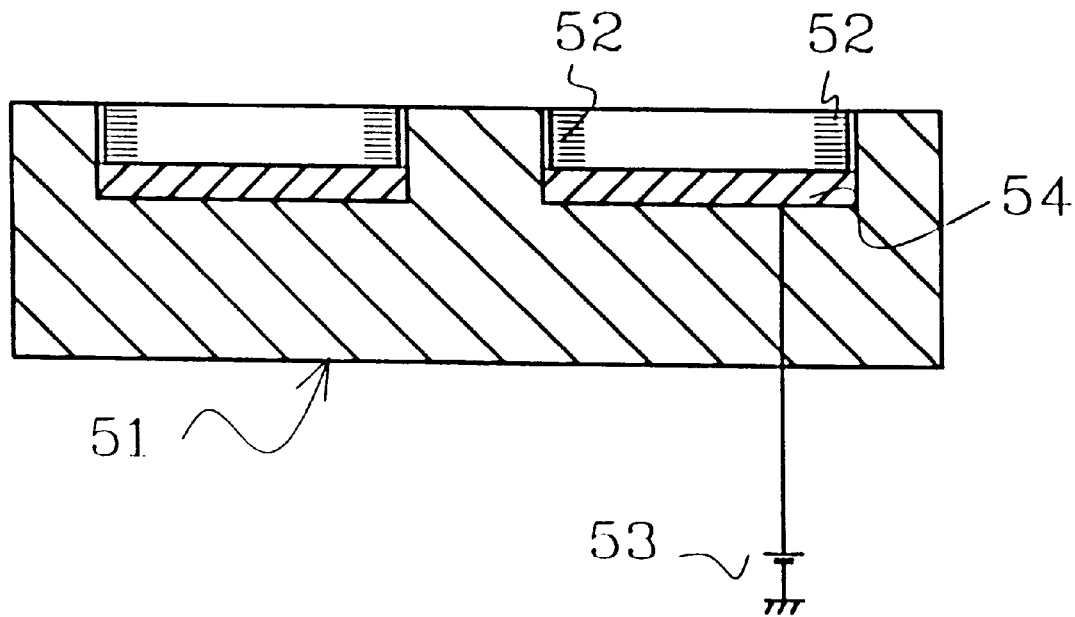
FIG. 11 is a sectional view of a conveyance table of the sixth embodiment.

FIG. 10 is a schematic view showing a sixth embodiment of the present invention. FIG. 11 is a sectional view of a conveyance table.

In this embodiment, arranged at the disk receiving portion of the conveyance table 51 are the electrodes, concretely, a conductive metal plate 54 at the bottom side of disk, as the electrode to the back side of the disk, and conductive napped sheets 52 in an inward and outward duplicate manner, as the electrodes to the lateral surfaces of disk (outer and inner lateral circumferential surfaces of disk), so as to supply electric charges to both of the back side and lateral sides of disk. These electrodes are connected to the power supply device 53.

As described, the lateral surfaces and rear surface of disk are supplied with electric charges, so that the surface electric potential necessary for transferring the toner image can be more satisfactorily maintained up to the edge portion of the surface to be printed. The remainder is identical with the embodiment of FIG. 5.

Figure 12:
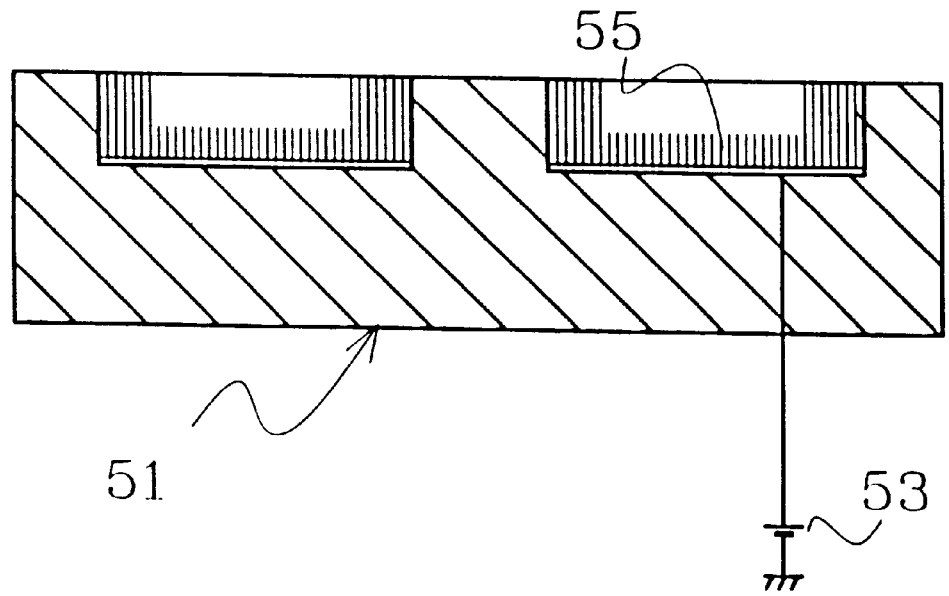
FIG. 12 is a sectional view of a conveyance table showing a seventh embodiment of the present invention.

FIG. 12 is a sectional view of a conveyance table showing a seventh embodiment of the present invention.

In this embodiment, arranged at the disk receiving portion of the conveyance table 51 are the electrodes, concretely, conductive napped sheets 55, so as to supply electric charges to both of the back side and lateral sides of disk (outer and inner lateral circumferential surfaces of disk). These conductive napped sheet 55 are connected to the power supply device 53.

As described, by also adopting the conductive napped sheet for the back side of disk, electric charge can be more stably supplied by virtue of approach or contact of the tips of naps thereto.

There will be explained a surface electric resistance of disk, hereinafter.

The electric resistance of the surface to be printed to be label printed is adjusted to be equal to or less than $1 \times 10^{14}$ $\Omega$ (preferably less than $1 \times 10^{13}$ ohm, and more preferably equal to or less than $1 \times 10^{12}$ $\Omega$) so as to equalize the electric resistance of the surface to be printed of the disk, to thereby efficiently supply electric charge to the surface to be printed, improving the printing quality.

As a representative process for adjusting the electric resistance of the surface to be printed of the disk to be label printed to be equal to or less than $1 \times 10^{14}$ Ω, there can be mentioned one in which the surface to be printed is applied such as with resistance adjusting material or ink including the same.

As resistance adjusting material, there can be mentioned such as cationic surfactant, anionic surfactant, or amphoteric surfactant.

Specific Examples of Surfactant:

Cationic surfactant: aliphatic quaternary ammonium salt, aliphatic amine salt, etc.

Anionic surfactant: sulfonate, carboxylate, sulfuric ester salt, phosphoric ester salt, etc.

Amphoteric surfactant: imidazoline derivatives such as 2-alkylimidazoline, or amino-carboxylate, etc.

These surfactants can be used separately, or in combination.

Among these surfactants, cationic surfactants such as aliphatic quaternary ammonium salt and aliphatic amine salt are preferred for the present invention, since they improve the transfer ability of toner.

The resistance adjusting material is typically used by diluting it to a concentration equal to or less than a few weight %. The solvent for dilution is to be what does not affect the disk, such as water, ethanol, mixture thereof, while considering applicability onto disk. The concentration of resistance adjusting material is not particularly specified. However, if the concentration of resistance adjusting material is thick or the applied quantity is so much, the adhesive degree between disk and resistance adjusting material is deteriorated. Then, the resistance adjusting material may contaminate those parts of the printing apparatus which contact with the surface to be printed of the disk which is to be label printed, affecting the printing. Thus, it is preferable to lower the concentration of resistance adjusting material and reduce its quantity itself to be applied.

The ink which includes resistance adjusting material is not particularly specified. For example, it is even possible to mix the aforementioned resistance adjusting material into an ultraviolet curable ink which is typically used for label printing onto disks. Also, the mixing ratio or quantity is not particularly specified.

As the process for applying onto disks the resistance adjusting material or ink including the same, there can be mentioned such as spin coat process, spray coating process, roll coat process, screen printing process.

The measuring procedure of the surface electric resistance is as follows:

The resistance is to be measured in conformity to JIS-K6911, with application voltage of 100 V, at an ambient temperature of 23° C. and in a relative humidity (RH) of 50%, by utilizing the product of K.K. Advantest having a trade name:

"Resistivity Chamber R12704" [main electrode diameter 50 mm, guard ring inner diameter 70 mm, guard ring outer diameter 80 mm, opposing electrode 110 mm×110 mm (not used during measurement of electric resistance)]; and the product of K.K. Advantest having a trade name:

"Digital Ultra-High-Resistance/Micro Current Meter R8340A".

Tables 1 and 2 show several evaluation results (No.1-1 to No.1-6) of printing unevenness based on the first embodiment, in which the electrodes are provided by roller, bush or sheet, and the existence of application of surface resistance adjusting ink is varied, together with a comparative example which adopts a scorotoron (uncontacted) as electrode.

TABLE 1

|  | Working Example No. 1-1 | Working Example No. 1-2 | Working Example No. 1-3 |
|---|---|---|---|
| Electrode | Roll | Brush | Sheet |
| Existence of Surface Resistance Ink Application | YES | YES | YES |
| Number of Disks with unevenness in 100 Disks | 2 | 1 | 1 |

TABLE 2

|  | Working Example No. 1-4 | Working Example No. 1-5 | Working Example No. 1-6 | Comparative Example |
|---|---|---|---|---|
| Electrode | Roll | Brush | Sheet | scorotoron uncontacted |
| Existence of Surface Resistance Ink Application | NO | NO | NO | NO |
| Number of Disks with unevenness in 100 Disks | 14 | 9 | 8 | 100 |

As described above, excellent printing can be uniformly applied onto a surface to be printed according to the present invention, in case that the toner image is electrically transferred onto a surface to be printed of the matter to be printed by means of an electrophotographic process, to print such as labels.

Thus, the industrial applicability is great.

What is claimed is:

1. A printing method for printing an image upon a surface to be printed of an object by a transfer to said surface to be printed of a charged toner on a transfer medium, comprising:

contacting an electrode contacted to a power supply device with said object in a vicinity of a transfer position;

supplying an electric charge to said object; and transferring said charged toner on said transfer medium onto said surface to be printed.

2. The printing method of claim 1, wherein said contacting step comprises:

contacting said electrode contacted to said power supply device with said surface to be printed of said object in said vicinity of said transfer position.

3. The printing method of claim 2, further comprising:

adjusting said surface to be printed to possess a surface electrical resistance equal to or less than $1 \times 10^{14}$ Ω prior to transferring said charged toner.

4. The printing method of claim 2, further comprising the step of:

adjusting said surface to be printed to possess a surface electrical resistance equal to or less than $1 \times 10^{13}$ Ω prior to transferring said charged toner.

5. The printing method of claim 2 wherein said transferring step comprises:

transferring said charged toner to a conductive surface of said object.

6. The printing method of claim 2, further comprising the step of:

contacting one or more further electrodes connected to said power supply device to at least one of said surface to be printed of said object, a side surface of said object, and a back surface of said object.

7. The printing method of claim 6, wherein said transferring step comprises:

transferring said charged toner to a conductive surface of said object.

8. In a printing device for printing an image upon a surface to be printed of an object by transfer onto said surface to be printed of a charged toner on a transfer medium, the improvement comprising:

an electrode connected to a power supply device and configured to contact said surface to be printed in a vicinity of a transfer position to promote transfer of said charged toner on said transfer medium onto said surface to be printed.

9. The printing device of claim 7, further comprising:

at least one further electrode connected with said power supply device in contact with at least one of said surface to be printed of said object, a side surface of said object, and a back surface of said object.

10. An object to be printed according to the method of claim 2.

11. The object according to claim 10, wherein said surface to be printed has a surface electric resistance equal to or less than $1 \times 10^{14}$ Ω.

12. An optical disk to be printed according to the method of claim 2.

13. The optical disk according to claim 12, wherein said surface to be printed has a surface electric resistance equal to or less than $1 \times 10^{14}$ Ω.

* * * * *